United States Patent
Yamanaka

(10) Patent No.: US 10,809,454 B2
(45) Date of Patent: Oct. 20, 2020

(54) LIGHTING DEVICE AND DISPLAY DEVICE

(71) Applicant: SHARP KABUSHIKI KAISHA, Sakai, Osaka (JP)

(72) Inventor: Kazuyuki Yamanaka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/441,829

(22) Filed: Jun. 14, 2019

(65) Prior Publication Data

US 2019/0383997 A1 Dec. 19, 2019

Related U.S. Application Data

(60) Provisional application No. 62/685,581, filed on Jun. 15, 2018.

(51) Int. Cl.
*G02F 1/1335* (2006.01)
*F21V 8/00* (2006.01)

(52) U.S. Cl.
CPC ......... *G02B 6/0095* (2013.01); *G02B 6/0076* (2013.01); *G02F 1/133504* (2013.01)

(58) Field of Classification Search
CPC .................................................. G02B 6/0095
See application file for complete search history.

(56) References Cited

U.S. PATENT DOCUMENTS

| | | | | |
|---|---|---|---|---|
| 2011/0187634 A1* | 8/2011 | Kim | ......................... | G09G 3/36 345/102 |
| 2011/0211133 A1* | 9/2011 | Kamada | ............ | G02F 1/133608 348/739 |
| 2012/0069261 A1* | 3/2012 | Lee | ................... | G02F 1/133615 349/58 |
| 2013/0077020 A1* | 3/2013 | Rohrmoser | ............. | G09F 13/04 349/62 |
| 2014/0226210 A1* | 8/2014 | Moriwaki | ................ | G02B 1/11 359/601 |
| 2014/0333844 A1* | 11/2014 | Ito | ..................... | G02F 1/133308 348/794 |
| 2015/0277181 A1* | 10/2015 | Onishi | .............. | G02F 1/134363 349/59 |
| 2016/0085117 A1* | 3/2016 | Arai | .................. | G02F 1/133608 348/725 |
| 2016/0109648 A1* | 4/2016 | Lee | ................... | G02F 1/133308 362/606 |
| 2016/0147107 A1* | 5/2016 | Cho | .................. | G02F 1/133308 349/58 |
| 2016/0259121 A1* | 9/2016 | Yonezawa | ............. | G02F 1/1333 |
| 2018/0321556 A1* | 11/2018 | Watanabe | ............ | G02B 6/0025 |
| 2019/0129236 A1* | 5/2019 | Kim | ..................... | G02B 6/0073 |

FOREIGN PATENT DOCUMENTS

JP 2008-203444 A 9/2008

* cited by examiner

*Primary Examiner* — Sang V Nguyen
(74) *Attorney, Agent, or Firm* — ScienBiziP, P.C.

(57) ABSTRACT

A lighting device for illuminating an illuminated body with light includes a light source, a light guide plate, and an optical sheet. The light guide plate is configured to guide light from the light source. The optical sheet is configured to impart an optical effect to light exiting from the light guide plate. The optical sheet includes at least one communicating groove that communicates from an outer peripheral end face of the optical sheet to a surface opposed to the illuminated body.

1 Claim, 7 Drawing Sheets

LIGHTING DEVICE AND DISPLAY DEVICE

CROSS REFERENCE TO RELATED APPLICATION

This application claims priority from Japanese Patent Application No. 62/685,581 filed on Jun. 15, 2018. The entire contents of the priority application are incorporated herein by reference.

TECHNICAL FIELD

The technology described herein relates to a lighting device and a display device.

BACKGROUND ART

A known example of a conventional liquid crystal display device is disclosed in Patent Literature 1 listed below. This liquid crystal display device disclosed in Patent Literature 1 includes a backlight, a liquid crystal panel that is illuminated by the backlight, a frame that accommodates the backlight and the liquid crystal panel, a light-blocking adhesive tape that bonds the backlight and the frame together and prevents light from the backlight from leaking into the surrounding area, and a double-sided tape that bonds the liquid crystal panel and the frame together. Using the double-sided tape separately from the light-blocking adhesive tape for bonding the liquid crystal panel and the frame together makes it possible to easily replace the liquid crystal panel without damaging the backlight or the like. An example of such a system is disclosed in Japanese Patent Application Publication No. 2008-203444.

SUMMARY

In the liquid crystal display device described in Patent Literature 1 listed above, the light-blocking adhesive tape also serves to fix various types of optical film group (optical sheet) that are placed on a side of the backlight that faces the liquid crystal panel. Since the light-blocking adhesive tape and the double-sided tape, which bonds the liquid crystal panel and the frame together, causes a gap between the optical sheet and the liquid crystal panel to be an enclosed space whose perimeter is covered, the optical sheet warps due to a pool of air n the enclosed space at the time of bonding of these members and sticks to the liquid crystal panel. Further, in a case where the optical sheet has expanded or contracted from any cause after bonding, similar symptoms may develop. As a result, the liquid crystal display device suffers from unevenness in luminance or makes a concentric striped pattern called a Newton ring.

Along with a reduction in thickness of the liquid crystal display device, the gap between the optical sheet and the liquid crystal panel becomes even narrower and the optical sheet per se tends to become thinner; therefore, there is fear that such a problem becomes even more salient in the future.

The technology described herein was made in view of the above circumstances. An object is to reduce warpage of an optical sheet.

(1) An embodiment of the technology described herein is directed to a lighting device for illuminating an illuminated body with light, the lighting device including: a light source; a light guide plate configured to guide light from the light source; and an optical sheet configured to impart an optical effect to light exiting from the light guide plate, wherein the optical sheet has at least one communicating groove that communicates from an outer peripheral end face of the optical sheet to a surface opposed to the illuminated body.

In this way, when the lighting device and the illuminated body (liquid crystal panel) are bonded together and the optical sheet is placed opposite the liquid crystal panel, the at least one communicating groove of the optical sheet serves as a passageway for air that is present in a gap between the liquid crystal panel and the optical sheet. The air is released to the outside from a side of the lighting device through the at least one communicating groove. This eliminates a pool of air in the gap. This inhibits the optical sheet from warping to stick to the liquid crystal panel.

The technology described herein makes it possible to reduce warpage of an optical sheet.

DETAILED DESCRIPTION

First Embodiment

A first embodiment of the technology described herein is described with reference to FIGS. 1 to 3. The present embodiment illustrates a liquid crystal display device (display device) 10. It should be noted that some of the drawings show an X axis, a Y axis, and a Z axis and are drawn so that the direction of each axis is an identical direction in each drawing. Further, FIG. 2 shows the front side up and the back side down.

Figure 1:
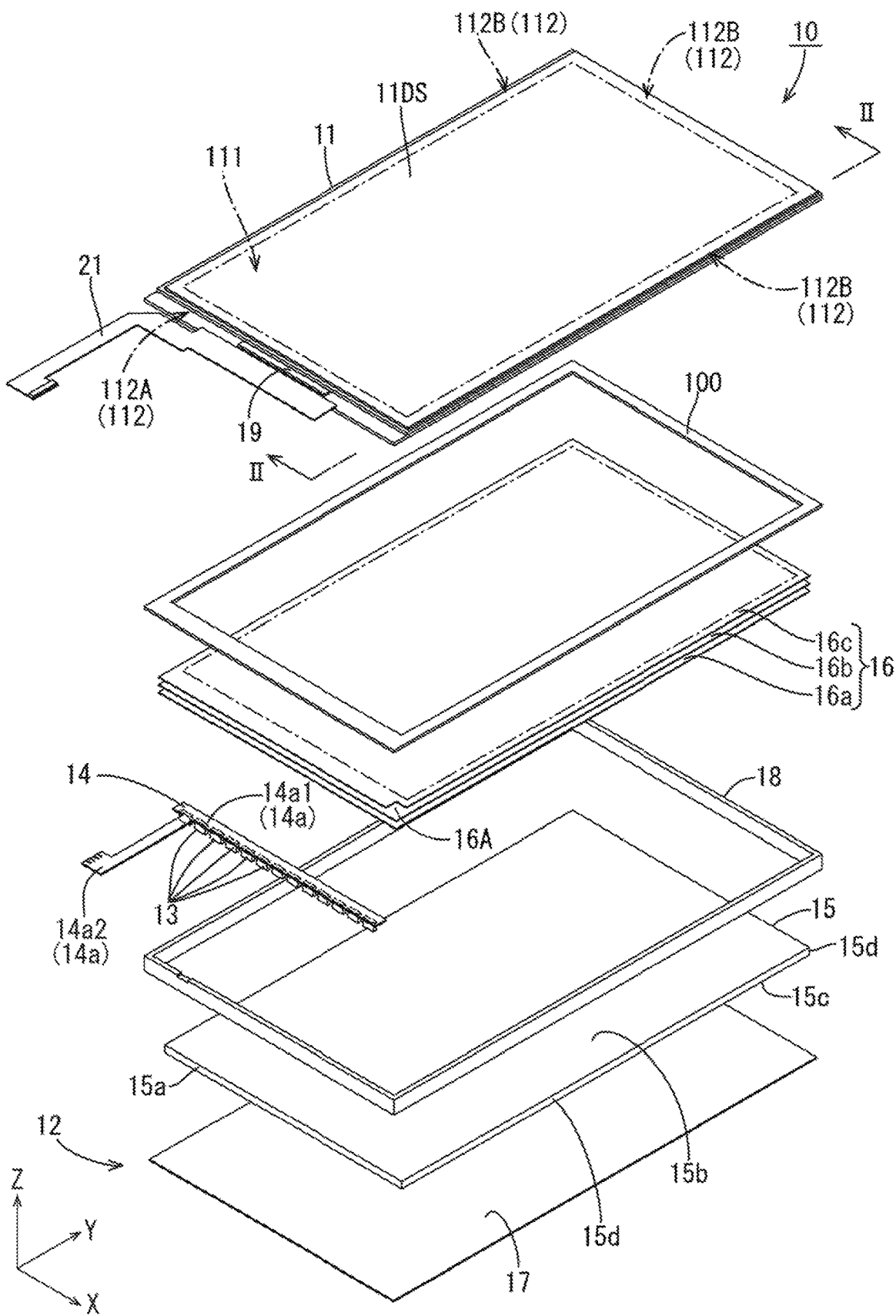
FIG. 1 is an exploded perspective view of a liquid crystal display device according to a first embodiment of the technology described herein.

As shown in the exploded perspective view of FIG. 1, the liquid crystal display device 10 has a vertically long rectangular shape as a whole. The liquid crystal display device 10 includes a liquid crystal panel (display panel, illuminated body) 11 having a display surface 11DS that is capable of displaying an image, a backlight device (lighting device) 12, disposed behind the liquid crystal panel 11, that illuminates the liquid crystal panel 11 with light for display, and a fixing tape 100 that bonds the liquid crystal panel 11 and the backlight device 12 together. The liquid crystal display device 10 according to the present embodiment is intended to be used in a portable information terminal such as a smartphone. For this reason, the screen size of the liquid crystal panel 11 of the liquid crystal display device 10 is a size (e.g. approximately several inches) that is typically classified as a small size.

First, the liquid crystal panel 11 is described. This liquid crystal panel 11 has a display section (active area) 111 in which an image is displayed and a non-display section (non-active area) 112, formed in the shape of a frame that surrounds the display section 111, in which no image is displayed. The non-display section 112 has four side parts that constitute the frame, and the four side parts include a side part 112A at which the after-mentioned LEDs 13 are located when the liquid crystal panel 11 is mounted in the liquid crystal display device 10 and the other side parts 112B.

Figure 2:
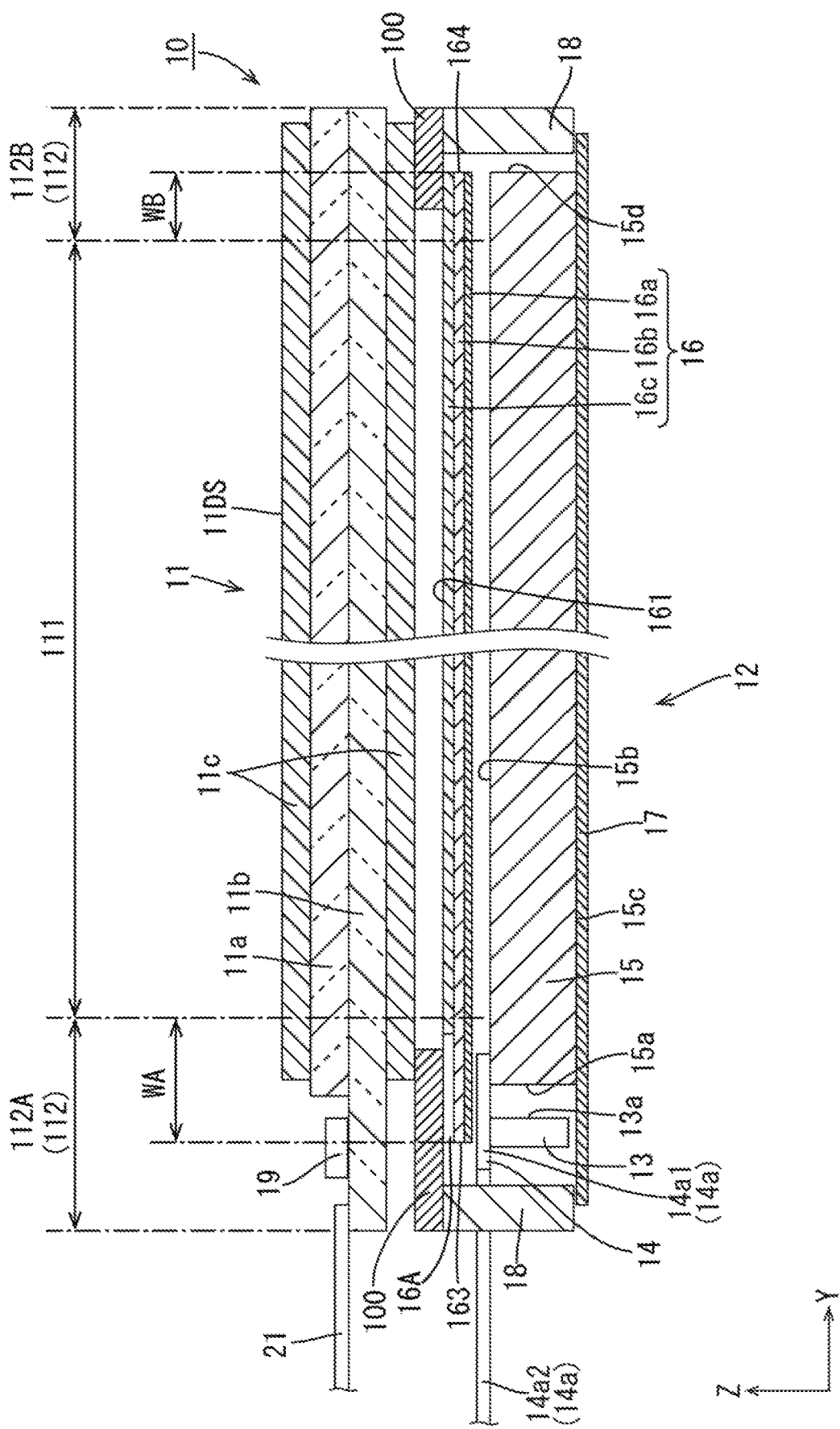
FIG. 2 is a cross-sectional view of the liquid crystal display device according to the first embodiment of the technology described herein as taken along line II-II in FIG. 1.

FIG. 2 is a cross-sectional view of the liquid crystal display device 10 as taken along line II-II in FIG. 1. As shown in the cross-sectional view of FIG. 2, the liquid crystal panel 11 includes a pair of substantially transparent glass substrates 11a and 11b bonded together with a predetermined gap therebetween and liquid crystals sealed in between the two substrates 11a and 11b. Of the pair of substrates 11a and 11b, an array substrate (active matrix substrate) 11b disposed at the back is provided with switching elements (e.g. TFTs) connected to source lines and gate lines that are orthogonal to each other, pixel electrodes connected to the switching elements, an alignment film, and the like. A pair of front and back polarizing plates 11c are pasted to outer surfaces of the pair of substrates 11a and 11b, respectively.

As shown in FIGS. 1 and 2, the array substrate 11b of the liquid crystal panel 11 is mounted with a driver (panel drive component) 19 that drives the liquid crystal panel 11 and a flexible substrate (connecting component) 21 that electrically connects the liquid crystal panel 11 and an external panel control substrate (not illustrated) to each other. Among these, the driver 19 is mounted on the array substrate 11b by COG (Chip On Glass). The driver 19 is constituted of an LSI chip having a drive circuit inside, operates in accordance with a signal that is supplied from a panel control substrate serving as a signal supply source and thereby generates an output signal by processing an input signal that is supplied from the panel control substrate, and outputs the output signal to a display region of the array substrate 11b. The flexible substrate 21 includes a base material made of a synthetic resin material (such as polyimide resin) having insulation properties and flexibility, and has a large number of wiring patterns (not illustrated) on the base substrate. The flexible substrate 21 is bent in a folded manner in the liquid crystal display device 10, and first and second ends of the flexible substrate 21 in a length direction are connected to the panel control substrate and the array substrate 11b of the liquid crystal panel 11, respectively.

Next, the backlight device 12 is described. As shown in FIG. 1, the backlight device 12 includes LEDs (light-emitting diodes) 13 serving as light sources, an LED substrate (light source substrate) 14 mounted with the LEDs 13, a light guide plate 15 that guides light from the LEDs 13, an optical sheet (optical member) 16 stacked on the front side of the light guide plate 15, a reflecting sheet (reflecting member) 17 stacked on the back side of the light guide plate 15, and a frame 18 that accommodates the LEDs 13, the light guide plate 15, the optical sheet 16, and the like. The backlight device 12 has its LED substrate 14 disposed along one short side end thereof, and is a one-side light entrance edge-lighting (side-lighting) backlight device in which light from the LEDs 13 enters the light guide plate 15 only through one side. The following describes the components of the backlight device 12 in detail.

As shown in FIG. 1, each of the LEDs 13 is configured such that an LED chip is sealed by a sealant on a base member that is firmly fixed to the LED substrate 14. This LED 13 has an anode terminal and a cathode terminal (not illustrated), and a direct current serving as a forward bias flows between the anode terminal and the cathode terminal, whereby the LED chip emits light. The LED 13 emits white light as a whole by having its LED chip designed to monochromatically emit blue light and having its sealant dispersedly blended with phosphors (such as a yellow phosphor, a green phosphor, and a red phosphor). The LED 13 has its light-emitting surface 13a adjacent to a surface thereof mounted on the LED substrate 14. As such, the LED 13 is a so-called side-emitting light-emitting diode.

As shown in FIG. 1, the LED substrate 14 is disposed in front of the frame 18 and the light guide plate 15, and is disposed in such a manner as to be sandwiched between the frame 18 and the optical sheet 16 and between the light guide plate 15 and the optical sheet 16. The LED substrate 14 has a base member (base material) 14a in the form of a flexible film (sheet) made of an insulating resin material. The base member 14a of the LED substrate 14 is constituted by an LED mounting portion 14a1 extending along the X-axis direction and a drawn portion 14a2 drawn from the LED mounting portion 14a1 to the outside of the frame 18 along the Y-axis direction. On the LED mounting portion 14a1, the plurality of (in FIG. 1, thirteen) LEDs 13 are mounted along a direction of extension (X-axis direction) thereof in such a manner as to be arranged at substantially regular intervals in the X-axis direction, and the LEDs 13 are serially connected to one another by an LED wiring part (not illustrated). The LED wiring part is fed with electricity from an LED control substrate (not illustrated) via the drawn portion 14a2.

As shown in FIG. 1, the LEDs 13 and the LED substrate 14 are located behind the short-side side part 112A of the non-display section 112. Note, however, that the LED substrate 14 is formed to be shorter than the side part 112A in the X-axis direction, and as shown in FIG. 2, the LEDs 13 and the LED substrate 14 are not included behind both ends of the side part 112A.

The light guide plate 15 is made of a substantially transparent synthetic resin material (e.g. acrylic resin such as PMMA, polycarbonate, or the like), and has a sufficiently higher refractive index than air. As shown in FIGS. 1 and 2, the light guide plate 15 has a vertically long plate shape which is similar to that of the liquid crystal panel 11, accommodated in such a manner as to have its perimeter surrounded by the frame 18, and is located directly below the liquid crystal panel 11 and the optical sheet 16. The light guide plate 15 has outer peripheral end faces including one short-side end face (left in FIG. 2) that serves as a light entrance end face (light source opposed end face) 15a, opposed to the LEDs 13, upon which light from the LEDs 13 falls, and the remaining three end faces (the other short-side end face and a pair of long-side end faces) serve as non-light entrance end faces (light source non-opposed end faces) 15d, not opposed to the LEDs 13, upon which the light from the LEDs 13 does not directly fall. This light entrance end face 15a runs parallel to the light-emitting surface 13a of the LED 13 and linearly extends along the X-axis direction (direction of arrangement of the LEDs 13). The light guide plate 15 has a pair of front and back plate surfaces. That one of these plate surfaces which faces toward the front side (i.e. toward the liquid crystal panel 11) serves as a light exit plate surface 15b that causes light to exit toward the liquid crystal panel 11, and that one of these plate surfaces which faces toward the back side serves as a light exit opposite plate surface 15c opposed to the light exit plate surface 15b. The light exit plate surface 15b runs parallel to the plate surface (display surface 11DS) of the liquid crystal panel 11, and is opposed to the plate surface of the liquid crystal panel 11 with the optical sheet 16, which will be described next, sandwiched therebetween. With such a configuration, the light guide plate 15 has a functional of introducing, through the light entrance end face 15a, light emitted along the Y-axis direction from the LEDs 13 and, after having propagated the light inside, raising the light along the Z-axis direction to cause the light to exit through the light exit plate surface 15b toward the optical sheet 16 (i.e. toward the front side or light exit side).

As shown in FIGS. 1 and 2, the optical sheet 16 has a vertically long plate shape which is similar to those of the liquid crystal panel 11 and the light guide plate 15 and has its plate surfaces running parallel to those of the liquid crystal panel 11 and the light guide plate 15. By being disposed in such a manner as to be interposed between the liquid crystal panel 11 and the light guide plate 15 in the Z-axis direction, the optical sheet 16 has a function of, while imparting a predetermined optical effect to emitted light from the light guide plate 15, causing the light to exit toward the liquid crystal panel 11. Specifically, the optical sheet 16 according to the present embodiment includes three optical sheets, namely a diffusion sheet 16a, a first prism sheet 16b, and a second prism sheet 16c, stacked in this order from the back side.

The diffusion sheet 16a includes a substantially transparent base material made of synthetic resin and a large number of diffusing particles dispersed in the base material, and has a function of diffusing light that passes through the diffusion sheet 16a. The first prism sheet 16b and the second prism sheet 16c each include a substantially transparent base material made of synthetic resin and a large number of prisms (not illustrated), provided in an arrangement on a plate surface of the base material, that extend along one direction, and selectively exerts a light-gathering effect in a direction of arrangement of the prisms. The first prism sheet 16b and the second prism sheet 16c are placed such that the prisms of the first prism sheet 16b and the prisms of the second prism sheet 16c are orthogonal to each other.

Figure 3:
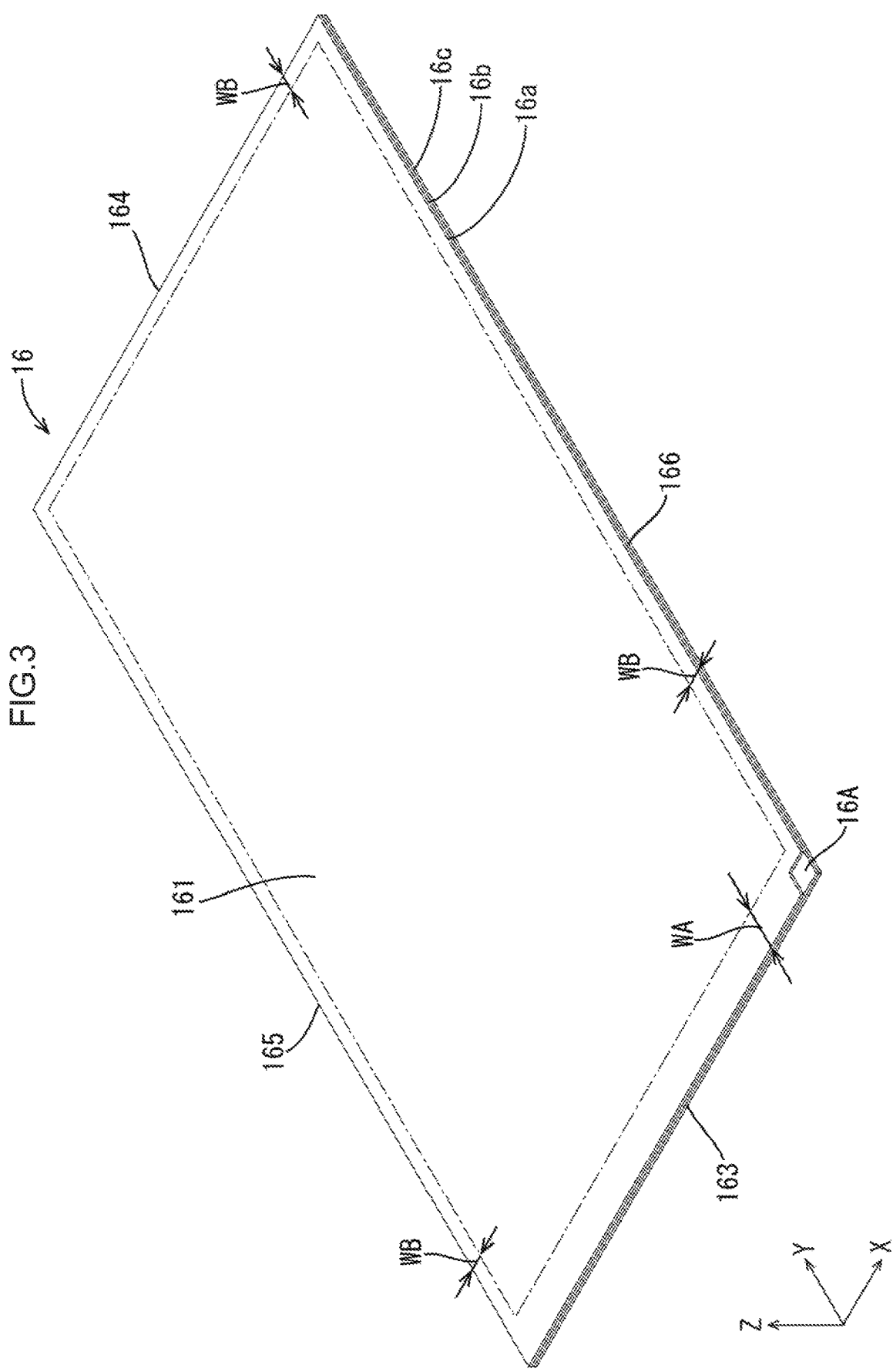
FIG. 3 is a perspective view of an optical sheet according to the first embodiment of the technology described herein.

As shown in the perspective view of FIG. 3, the optical sheet 16 has a surface 161 opposed to the liquid crystal panel 11, four outer peripheral end faces 163, 164, 165, and 166 (short-side outer peripheral end faces 163 and 164 and long-side outer peripheral end faces 165 and 166), and a communicating groove 16A that communicates from the surface 161 opposed to the liquid crystal panel 11 to the outer peripheral end face 163. The communicating groove 16A according to the present embodiment is portion (cut-off portion) obtained by cutting off, into the shape of a rectangular parallelepiped, a corner of the second prism sheet 16c, which is the layer of the laminated optical sheet 16 that is closest to the liquid crystal panel 11. The communicating groove 16A is easily formed by forming the second prism sheet 16c with this cut-off portion and putting the second prism sheet 16c on top of the first prism sheet 16b. It should be noted that the number of communicating grooves 16A is not limited to one but a plurality of the communicating grooves 16A may be formed in the optical sheet 16.

As indicated by dot-and-dash lines in FIGS. 1 to 3, the optical sheet 16, when placed in the liquid crystal display device 10, has a region opposed to the display section 111 and a region around the region opposed to the non-display section 112. The communicating groove 16A is formed in the optical sheet 16 so as to be located in the region opposed to the non-display section 112. In particular, it is preferable that the communicating groove 16A be formed in a part of this region opposed to the side part 112A at which the LEDs 13 are placed; furthermore, it is more preferable that the communicating groove 16A be formed at both ends thereof (i.e. corners of the four corners of the optical sheet 16 at which the LEDs 13 are placed).

As shown in FIGS. 1 and 2, the reflecting sheet 17 has its date surfaces, running parallel to those of the liquid crystal panel 11 and the light guide plate 15, and is disposed in such a manner as to cover the light exit opposite plate surface 15c of the light guide plate 15. The reflecting sheet 17 is high in light reflectivity, and can efficiently raise, toward the front side (i.e. toward the light exist plate surface 15b), light having leaked through the light exit opposite plate surface 15c of the light guide plate 15. The reflecting sheet 17 has an outer shape which is a size larger than that of the light guide plate 15, and has one long side end disposed in such a manner as to protrude beyond the light entrance end face 15a toward the LED 13.

The frame 18 is made of synthetic resin (e.g. polycarbonate) whose surface presents the color of white, and as shown in FIGS. 1 and 2, the frame 18 is formed in the shape of a frame whose outer shape is a size larger than that of the light guide plate 15. The frame 18 is disposed in such a manner as to surround and accommodate the plurality of LEDs 13, the light guide plate 15, the optical sheet 16, and the like en bloc. The frame 18 has a lower surface over which the reflecting sheet 17 extends, and there is a small gap between the lower surface of the frame 18 and an upper surface of the reflecting sheet 17.

Next, the fixing tape 100 is described. As shown in FIGS. 1 and 2, the fixing tape 100 has a vertically long frame shape (ring shape) in conformance with the frame shape (non-display section serving as a peripheral edge of the liquid crystal panel 11) of the liquid crystal display device 10, fixedly bonds the back polarizing plate 11c of the liquid crystal panel 11 and the front surface of the optical sheet 16 of the backlight device 12 together, and fixedly bonds the polarizing plate 11c and the front surface of the frame 18 together. It is preferable that the fixing tape 100 be a light-blocking double-sided tape including a light-blocking base material and an adhesive material applied to both surfaces of the base material.

The present embodiment is configured as described above, and the workings and effects of the liquid crystal display device 10 are described. In the liquid crystal display device 10 thus configured, as shown in FIG. 2, a part of the optical sheet 16 in which the communicating groove 16A is placed is not bonded to the fixing tape 100 and serve as an air passageway that leads to the outside of the liquid crystal display device 10. Air in gap between the liquid crystal panel 11 and the optical sheet 16 passes through the communicating groove 16A, reaches a side of the optical sheet 16 (left side of the outer peripheral end face 163 of FIG. 2) and a side of the light guide plate 15 (left side of the light entrance end face 15a of FIG. 2), and is let out of the liquid crystal display device 10 through the gap, which lies ahead, between the lower surface of the frame 18 and the upper surface of the reflecting sheet 17. For this reason, no pool of air appears in the gap between the liquid crystal panel 11 and the optical sheet 16. This inhibits the optical sheet 16 from warping to stick to the liquid crystal panel 11. As a result, the occurrence of unevenness in luminance of the liquid crystal display device 10 and the appearance of a Newton ring can be avoided.

Further, in this way, the air in the gap between the liquid crystal panel 11 and the optical sheet 16 is released t the outside from the gap between the lower surface of the frame 18 and the upper surface of the reflecting sheet 17. For example, this makes it harder for foreign matter to enter from the outside and makes it easier to prevent light from leaking the surrounding area than in a case where the fixing tape 100, which is a light-blocking double-sided tape, is provided with vent hole.

Meanwhile, placing the communicating groove 16A makes a difference in degree of subjection to an optical effect between light that is emitted toward the liquid crystal panel 11 through the communicating groove 16A in the optical sheet 16 and light that is emitted toward the liquid crystal panel 11 without passing through the communicating groove 16A. Specifically, since the communicating groove 16A of the present embodiment is a cut-off portion of the second prism sheet 16c, light having passed through the communicating groove 16A is not subjected to the light-gathering effect exerted by the second prism sheet 16c. This is handled in the present embodiment by placing the communicating groove 16A in the region opposed to the non-display section 112 so that light having passed through the communicating groove 16A is emitted toward the non-display section 112. This diminishes the effect on the display section 111.

As shown in FIGS. 1 and 3, this region opposed to the non-display section 12 has a frame shape that extends along the outer periphery of the optical sheet 16, and a part of this region opposed to the side part 112A at which the LEDs 13 are placed is normally wide in width. For example, in a case where the liquid crystal panel 11 has a screen size of several inches, the width WA of the region opposed to the side part 112A is approximately 1 mm, whereas the width WB of each of the regions opposed to the other side parts 11B is approximately 0.3 mm to 0.5 mm. For this reason, placing the communicating groove 16A in the region opposed to the side part 112A makes it easy to form the communicating groove 16A in terms of space.

In particular, since this region does not include the LED substrate 14 or the like in the back at both ends (i.e. corners of the four corners of the optical sheet 16 at which the LEDs 13 are placed), providing communicating grooves 16A at these corners makes it hard for ventilation of air from the communicating grooves 16A to the outside to be hampered by the LED substrate 14 or the like. Further, since the LEDs 13 are not placed at these corners, leakage of light can be reduced.

Further, since placing a plurality of the communicating grooves 16A makes it possible to form a plurality of the aforementioned air passages, it becomes easy for the air in the gap between the liquid crystal panel 11 and the optical sheet 16 to be let out of the liquid crystal display device 10.

In the optical sheet 16 of the present embodiment, a sheet (second prism sheet 16c) that imparts a light-gathering effect is placed as the closest layer to the liquid crystal panel 11. Normally, this sheet most easily warps, as it faces the gap between the liquid crystal panel 11 and the optical sheet 16. Warpage of the sheet that imparts a light-gathering effect leads to partial nonuniformity in the distance between the sheet and the liquid crystal panel 11, makes it easy for a Newton ring to appear, and makes the problem salient. This makes it possible for the aforementioned communicating groove 16A to more effectively exert a warpage-reducing effect.

Further, placing the communicating grooves 16A in the closest layer (i.e. the second prism sheet 16c according to the present embodiment) to the liquid crystal panel 11 makes it possible to easily form the communicating groove 16A. Specifically, forming a layer in advance with a cut-off portion to become a communicating groove 16A and putting the layer on top of another layer makes it possible to easily form an optical sheet 16 including the communicating groove 16A.

It should be noted that when the fixing tape 100 is a light-blocking double-sided tape, light from the backlight device 12 (LEDs 13) can be prevented from leaking into the surrounding area and double-sided bonding can make bonding work more efficient.

<Modification>

An optical sheet 160 according to a modification of the technology described herein is described with reference to FIGS. 4 and 5. The present modification illustrates changes made to achieve the shape of a communicating groove 160A. It should be noted that a repeated description of components, actions, and effects which are similar to those of Embodiment 1 described above is omitted.

Figure 4:
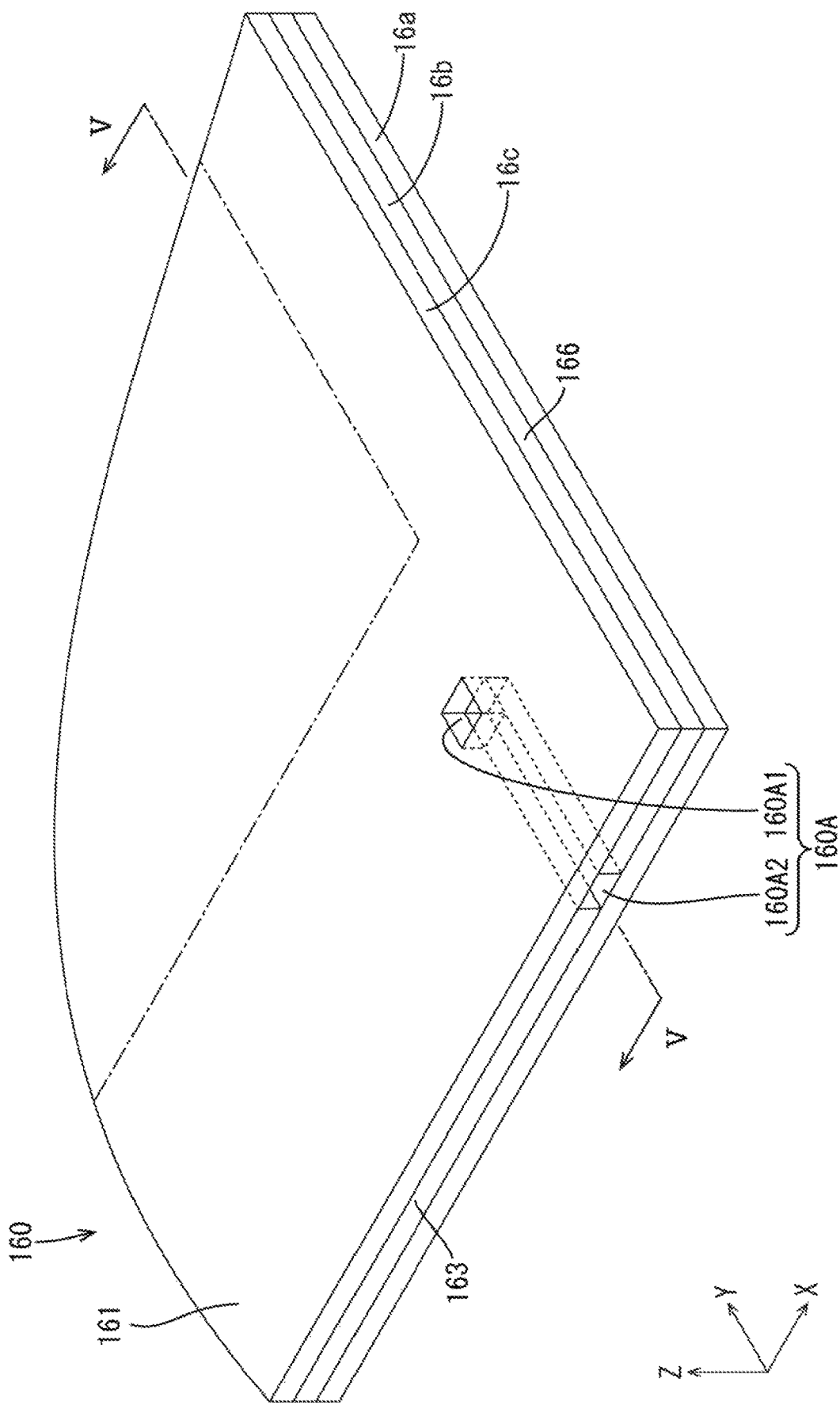
FIG. 4 is an enlarged perspective view showing a communicating groove of an optical sheet according to a modification of the technology described herein.
Figure 5:
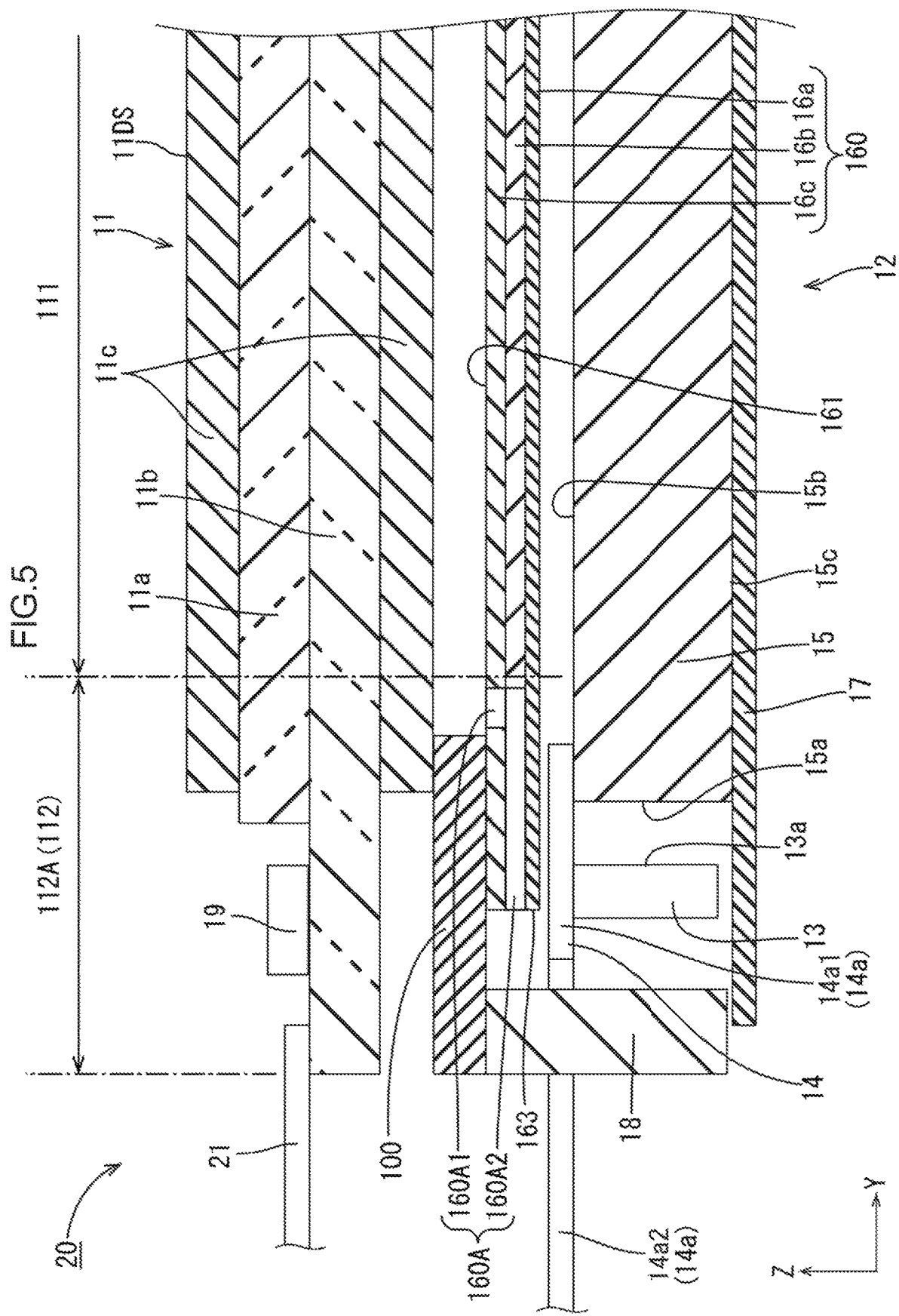
FIG. 5 is a partially-enlarged view of FIG. 2 in the case of the optical sheet according to the modification.

FIG. 4 is an enlarged perspective view of the communicating groove 160A of the optical sheet 160 and the area therearound, and FIG. 5 is a diagram of a case where the optical sheet 16 is replaced by the optical sheet 160 of the present modification in the cross-sectional view of FIG. 2. It should be noted that line V-V in FIG. 4 is an auxiliary line that indicates the position of a section line along which the optical sheet 160 is cut, and indicates the same section line as line II-II in FIG. 1.

As shown in FIGS. 4 and 5, the optical sheet 160 according to the present modification has the communicating groove 160A, which communicates from the surface 161 opposed to the liquid crystal panel 11 to the outer peripheral end face 163. However, unlike in The first embodiment, these two surfaces 161 and 163 communicate with each other through inside the optical sheet 16. The communicating groove 160A includes a first communicating hole 160A1 bored in the Z-axis (layer thickness) direction through the layer (i.e. the second prism sheet 16c according to the present embodiment) of the laminated optical sheet 16 that is closest to the liquid crystal panel 11 and a second communicating hole 160A2 that extends in the Y-axis (long side) direction through the layer (i.e. the first prism sheet 16b according to the present embodiment) directly below the closest layer to the liquid crystal panel 11 and makes the first communicating hole 160A1 and the outer peripheral end face 163 communicate with each other.

Placing the optical sheet 160 of the present modification in a liquid crystal display device 20 causes air in a gap between the liquid crystal panel 11 and the optical sheet 160 to pass through the second communicating hole 160A2 from the first communication hole 160A1, reach a side of the optical sheet 160, and be let out of the liquid crystal display device 20 through the gap, which lies ahead, between the lower surface of the frame 18 and the upper surface of the reflecting sheet 17, as depicted in FIG. 5. Providing the communicating groove 160A inside the optical sheet 160 makes it harder for foreign matter to enter from the outside. This also makes it possible to maintain adhesiveness to the fixing tape 100.

It should be noted that such a communicating groove 160A can be easily formed by forming a layer (i.e. the second prism sheet 16c of FIG. 4) in advance with a cut-off portion to become the first communicating hole 160A1, forming a layer (i.e. the first prism sheet 16b of FIG. 4) in advance with a cut-off portion to become the second communicating hole 160A2, and putting the layers on top of each other.

Second Embodiment

A second embodiment of the technology described herein is described with reference to FIGS. 6 and 7. The second embodiment illustrates changes made to achieve a configuration of a fixing tape 200. It should be noted that a repeated description of components, actions, and effects which are similar to those of The first embodiment described above is omitted.

Figure 6:
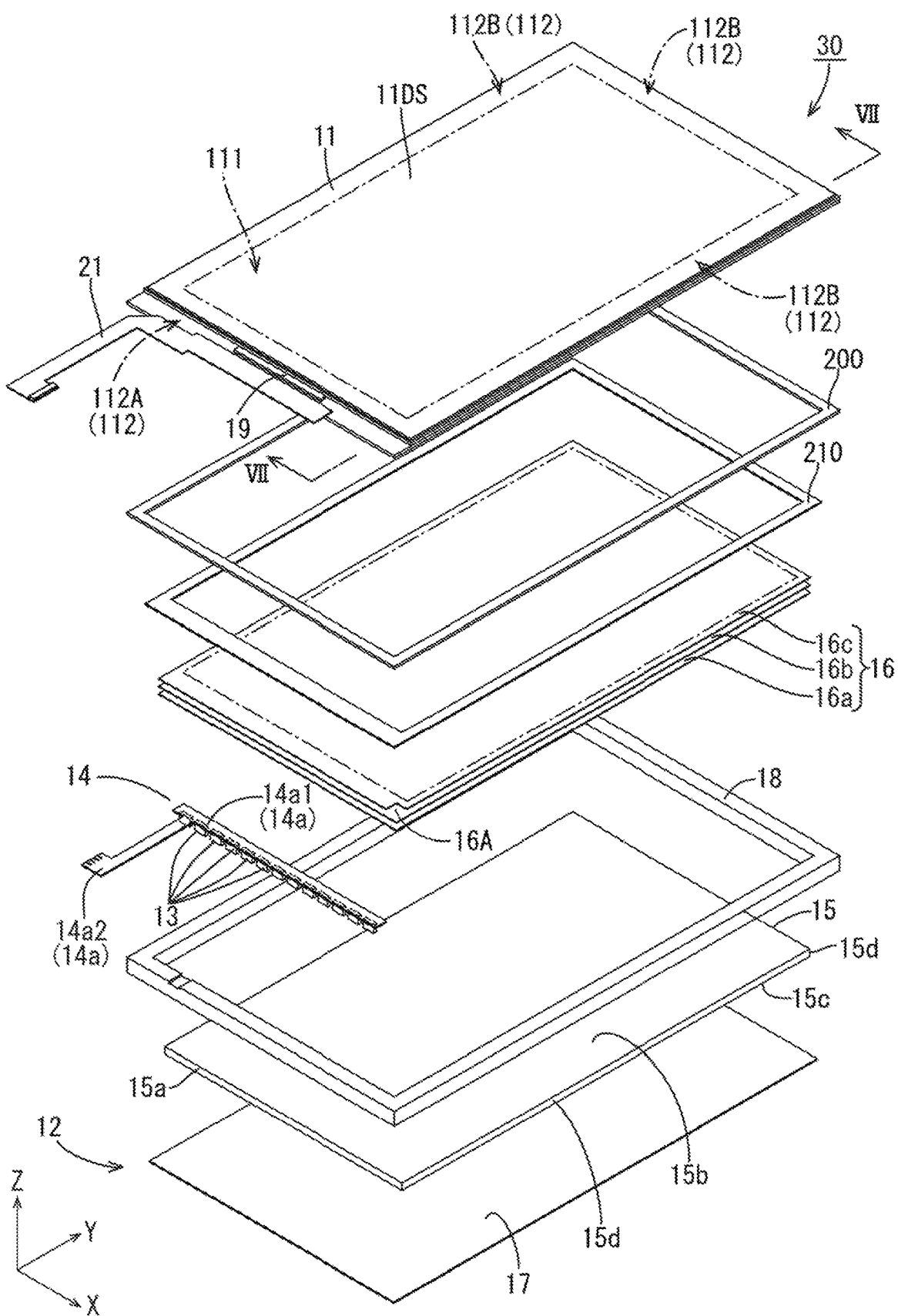
FIG. 6 is an exploded perspective view of a liquid crystal display device according to a second embodiment of the technology described herein.
Figure 7:
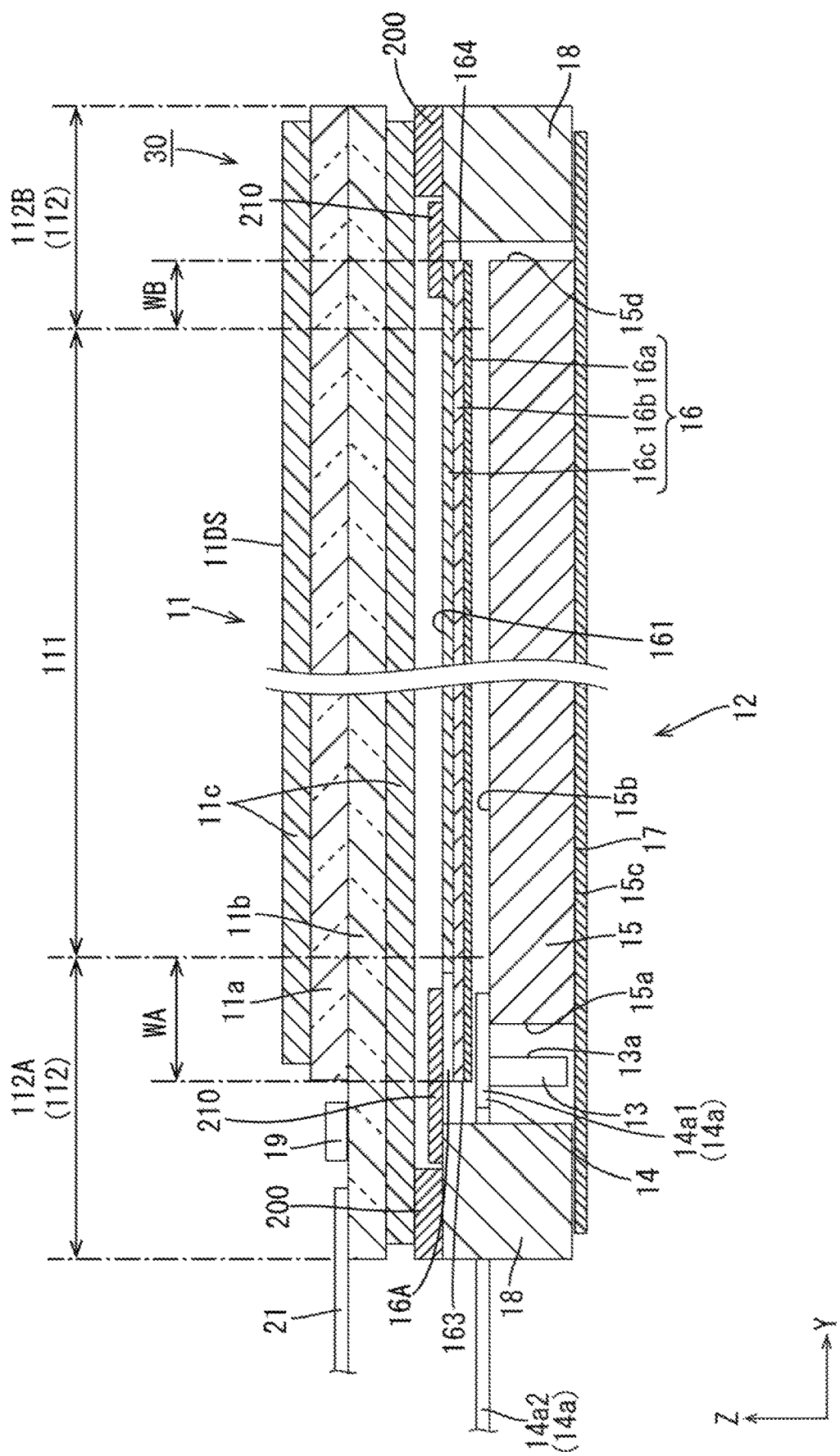
FIG. 7 is a cross-sectional view of the liquid crystal display device according to the second embodiment of the technology described herein as taken along line VII-VII in FIG. 6.

FIG. 6 is an exploded perspective view of a liquid crystal display device 30 according to The second embodiment of the technology described herein, and FIG. 7 is a cross-sectional view of the liquid crystal display device 30 as taken alone line VII-VII in FIG. 6.

As shown in FIGS. 6 and 7, the fixing tape 200 according to the present embodiment fixedly bonds the back polarizing plate 11c, which is extended in the Y-axis direction, and the front surface of the frame 18 together but, unlike in The first embodiment, does not bond the polarizing plate 11c and the optical sheet 16 together. The optical sheet 16 is fixedly bonded to the front surface of the frame 18 by an adhesive tape 210 that is separate from the fixing tape 200. A part of the optical sheet 16 in which the communicating groove 16A is placed is not bonded to the adhesive tape 210 and serves as an air passageway that leads to the outside of the liquid crystal display device 30. It should be noted the optical sheet 160 of the aforementioned modification is also applicable to the present embodiment.

OTHER EMBODIMENTS

The technology described herein is not limited to the embodiments described above with reference to the drawings. The following embodiments may be included in the technical scope of the technology described herein.

(1) Although The first embodiment described above has shown an example in which the shape of the communicating groove is a rectangular parallelepiped and The second embodiment described above has shown an example of the shape of each of the first and second communicating holes is a rectangular parallelepiped, other shapes will do. Examples of such shapes include a pyramid, a circular cylinder, and the like.

(2) Although The second embodiment described above has shown an example in which the shapes of the first and second communicating holes are both rectangular parallelepipeds, the shapes may be different from each other. Further, the communicating groove may be of a complex shape including a third and subsequent communicating holes.

(3) In The first embodiment described above, the lower surface of the communicating groove is at the same level as the lower surface of the laminated layer. Alternatively, the lower surface of the communicating groove does not need to be at the same level as the lower surface of the laminated layer. The lower surface of the communicating groove may be at a higher level than the lower surface of the laminated layer, or may be at a lower level than the lower surface of the laminated layer (spread to a layer that is at a lower level than the layer).

(4) Although The second embodiment described above has shown an example in which the first communicating hole is placed in the closest layer to the liquid crystal panel and the second communicating hole is placed in the layer directly below the closest layer to the liquid crystal panel, the communicating holes do not need to be formed in each separate layer but may be formed across a plurality of layers.

(5) Although each of the embodiments described above has shown an example in which a communicating groove is formed by forming a layer in advance with the communicating groove and stacking the layer on top of another layer, a communicating groove may be formed after stacking layers on top of each other first.

(6) Although each of the embodiments described above has shown an example in which the optical sheet includes, three optical sheets, namely the diffusion sheet, the first prism sheet, and the second prism sheet, stacked in this order from the back side, the number of sheets that are stacked and the types of the sheets are subject to change as appropriate. The optical sheet does not need to be laminated but may be of a single-layer configuration.

(7) Although each of the embodiments described above has shown a configuration in which all of the respective outer peripheral end faces of the light guide plate, the optical sheet, and the reflecting sheet are not flush with one another, all of them may be configured to be flush with one another.

(8) Although each of the embodiments described above has shown a case in which the outer shape of the liquid crystal display device and the outer shape of each component of the backlight device in conformance with the outer shape of the liquid crystal display device are rectangular shapes, the outer shapes may be non-rectangular shapes. Examples of such non-rectangular shapes include a semicircle, a sector, a trapezoid, and the like. In that case, the communicating groove may be placed at a peripheral edge of a non-rectangular optical sheet.

(9) Each of the embodiments described above has illustrated a liquid crystal panel configured such that a liquid crystal layer is sandwiched between a pair of substrates. Alternatively, the technology described herein is also applicable to a display panel in which functional organic molecules (medium layer) other than a liquid crystal material are sandwiched between a pair of substrates.

(10) Each of the embodiments described above has illustrated a liquid crystal display device including a liquid crystal panel classified as small in size. Alternatively, the technology described herein is also applicable to a liquid crystal display device including a liquid crystal panel classified as small to medium in size, medium in size, or large in size (very large in size) with a screen size of, for example, 10 inches to 100 inches. In that case, the liquid crystal display device may be used in an electronic apparatus such as a television receiver, an electronic billboard (digital signage) or an electronic blackboard. Further, a liquid crystal display device including a liquid crystal panel classified as small in size may be used in a portable electronic apparatus such as a tablet laptop personal computer as well as a smartphone.

(11) Each of the embodiments described above has illustrated a liquid crystal panel as the display panel. Alternatively, the technology described herein is also applicable to other types of display panel (such as a MEMS (micro electro mechanical systems) display panel).

The invention claimed is:

1. A display device comprising:
a display panel configured to display an image;
a lighting device disposed behind the display panel, the lighting device comprising:
a light source;
a light guide plate having a rectangular shape and being configured to guide light from the light source toward the display panel; and
an optical member having a rectangular shape including a first edge and a second edge perpendicular to the first edge and being configured to impart an optical effect to light exiting from the light guide plate, the optical member including a first optical sheet, a second optical sheet, and a third optical sheet, the first optical sheet being opposed to the light guide plate, the second optical sheet being sandwiched between the first optical sheet and the third optical sheet and including an elongated rectangular cutout extending parallel to the second edge from the first edge, the third optical sheet being opposed to the display panel and including a rectangular hole at a position corresponding to an end of the cutout in the second optical sheet, the rectangular hole including a first hole edge that is aligned with an end edge of the cutout and a second hole edge that is between the first edge of the optical member and the first hole edge; and a fixing tape having a rectangular frame shape and including a front surface and a back surface partially bonded to a back surface of the display panel and a front surface of the third optical sheet, respectively, the fixing tape including:

a first section disposed along the first edge of the optical sheet, the first section including an inner edge being disposed outer than the second hole edge; and a second section disposed along the second edge of the optical sheet.

\* \* \* \* \*